US 8,432,437 B2

(12) United States Patent
Shintani (10) Patent No.: US 8,432,437 B2
(45) Date of Patent: Apr. 30, 2013

(54) DISPLAY SYNCHRONIZATION WITH ACTIVELY SHUTTERED GLASSES (75) Inventor: Peter Rae Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 448 days.

(21) Appl. No.: 12/869,170

(22) Filed: Aug. 26, 2010

(65) Prior Publication Data
US 2012/0050506 A1   Mar. 1, 2012

(51) Int. Cl.
*H04N 13/04* (2006.01)

(52) U.S. Cl.
USPC .................................................. 348/56

(58) Field of Classification Search .............. None
See application file for complete search history.

(56) References Cited

U.S. PATENT DOCUMENTS

| | | | |
|---|---|---|---|
| 5,796,373 A | 8/1998 | Ming-Yen | |
| 6,727,867 B2 * | 4/2004 | Divelbiss et al. | 345/7 |
| 7,114,809 B2 | 10/2006 | Palovuori | |
| 7,180,554 B2 | 2/2007 | Divelbiss et al. | |
| 7,405,801 B2 | 7/2008 | Jacobs | |
| 2003/0112507 A1 | 6/2003 | Divelbiss et al. | |
| 2007/0035707 A1 | 2/2007 | Margulis | |
| 2008/0303963 A1 | 12/2008 | Jung et al. | |
| 2009/0091708 A1 | 4/2009 | Greene | |

FOREIGN PATENT DOCUMENTS
WO   WO 2009/033136   3/2009

OTHER PUBLICATIONS

International Search Report and Written Opinion, corresponding PCT Application No. PCT/US2011/41831, Oct. 26, 2011.
Kris Sangani, "Gadget Speak," Knowledge Network, Feb. 16, 2009.
Mihir Patkar, "How 3D TV Works: Part I—With Glasses," Think Digit, Oct. 20, 2009.
Tomi Engdahl, "3D Glasses and other 3D Display Devices," 1996-1997.
Lisa Litherland, "Cube 3D Glasses," Dec. 4, 2001.

* cited by examiner

*Primary Examiner* — Sath V Perungavoor
*Assistant Examiner* — Dakshesh Parikh
(74) *Attorney, Agent, or Firm* — Miller Patent Services; Jerry A. Miller (57) ABSTRACT An actively shuttered glasses synchronization signal generated by a 3D TV is detected by a device that has an output display. A periodicity of actuation of the actively shuttered glasses synchronization signal is determined. A display refresh rate of the output display is synchronized to the periodicity of actuation of the actively shuttered glasses synchronization signal. This abstract is not to be considered limiting, since other embodiments may deviate from the features described in this abstract.

36 Claims, 7 Drawing Sheets

DISPLAY SYNCHRONIZATION WITH ACTIVELY SHUTTERED GLASSES

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the United States Patent and Trademark Office patent file or records, but otherwise reserves all copyright rights whatsoever. Trademarks are the property of their respective owners.

BACKGROUND

Three-dimensional (3D) video content may be encoded for polarized and frame sequential formats. For polarized encoding, 3D video content may be generated by merging left and right images in either a side-by-side or top-and-bottom format on each frame of video content. These images are scaled and formatted with opposite circular polarization onto odd and even lines of each displayed video frame, respectively. Passive polarized 3D glasses are used to present the left and right eye images to the viewer. A frame sequential format operating at twice the frame rate of polarized encoding may be used such that each of the left and right images is sequentially rendered as a full frame of video content. Actively shuttered 3D glasses are synchronized with and controlled by a single 3D display device that generates the 3D content and selects which lens is active for each sequential frame.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program," or "computer program," may include a subroutine, a function, a procedure, an object method, an object implementation, in an executable application, an applet, a servlet, a source code, an object code, a shared library/dynamic load library and/or other sequence of instructions designed for execution on a computer system having one or more processors.

The term "program," as used herein, may also be used in a second context (the above definition being for the first context). In the second context, the term is used in the sense of a "television program." In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

The present subject matter provides automated display synchronization with actively shuttered glasses. Many viewers of three-dimensional (3D) televisions (TVs) that utilize actively shuttered glasses multi-task while watching 3D TV. These viewers often have another device with a display or other periodically refreshed output device (e.g., a light emitting diode (LED) output array or other device) in view when watching 3D TV with actively shuttered glasses. Such additional devices may include, for example, a laptop computer, handheld devices, (e.g., a cell phone, a gaming device, or other handheld device), a digital video recorder (DVR), or other devices. When 3D content is being viewed with actively shuttered glasses, the 3D content is pleasantly viewable, but other display devices will appear to flicker due to the aperture controls (e.g., for activating or opening, and for deactivating or closing) for each lens of the actively shuttered glasses being controlled by the 3D TV and synchronized to the 3D TV display refresh rate.

Flicker results because a refresh rate of the other display device is asynchronous to (not synchronized with) the aperture controls of the actively shuttered glasses. Flicker appears as a "beat" on the display of the other display device. The beat is a blanking period of refresh and is observable due to the asynchrony between the aperture controls of the actively shuttered glasses and the refresh rate of the other display device. The beat may drift down, for example, if the refresh rate of the other display is at a slightly different and lower frequency (e.g., 59.9 Hertz (Hz) rather than 60 Hz). Other beat variations and image distortions are possible. This beat may cause eye strain and discomfort for the 3D TV viewer when the viewer looks at the other display device.

With the increased use of computers, laptops, and handheld devices with output displays during 3D content viewing, the present subject matter provides for synchronization of the displays of such other devices with the aperture controls of the actively shuttered glasses. An actively shuttered glasses synchronization signal or signaling for the actively shuttered glasses originated by the 3D TV may be received by the other devices. The other devices may synchronize the refresh timing of their own respective displays to the aperture controls of the actively shuttered glasses to eliminate the beat on the respective displays when viewed through the actively shuttered glasses. If the other displays are synchronized with the aperture controls of the actively shuttered glasses, when the user is wearing the actively shuttered glasses the flicker previously seen when multi-tasking while watching 3D content will be greatly minimized or eliminated.

For purposes of the present description, "synchronization" with actively shuttered glasses synchronization signaling may be performed at a fundamental frequency at a one-to-one (1:1) ratio with detected signaling or may be performed harmonically. For example, a 3D TV may operate at sixty Hertz (60 Hz) and the synchronizing display device may operate at that same fundamental frequency (e.g., 1:1). Alternatively, if a 3D TV is operating at four hundred and eighty Hertz (480 Hz) and a display device operates at some sub-harmonic frequency of that operating frequency (e.g., 60 Hz), then synchronization may be performed at that sub-harmonic frequency. Further, where a 3D TV operates at a lower frequency (e.g., 60 Hz) and a synchronizing display device operates at a higher harmonic frequency (e.g., 240 Hz), the synchronizing display device may synchronize at that harmonic frequency. Many possibilities exist for harmonic and sub-harmonic synchronization in addition to one-to-one synchronization and all are considered within the scope of the present subject matter.

Many devices, such as 3D TVs and other devices, have an infrared (IR)-based remote control system. As such, the synchronization signal(ing) may be sent via IR such that those devices may leverage their existing hardware to synchronize with the aperture controls of the actively shuttered glasses. Display devices may also be modified to include an IR-based input to accommodate the described synchronization. 3D televisions often use an IR blaster to emit the aperture control synchronization signaling for the actively shuttered glasses. However, certain devices with which a user may interact while wearing actively shuttered glasses may not necessarily be in the field of view of such an IR blaster that sends the aperture control synchronization signaling for the actively shuttered glasses. In such implementations, other physical and communication layers, such as Bluetooth®, may be used for transmission and reception of the actively shuttered glasses synchronization signal(ing).

Additionally, for consumer electronics retail environments where 3D TVs may be placed side-by-side with other display devices, or where multiple 3D TVs may be placed in close proximity, a backplane, wired, or other signaling interconnection may be provided to couple the respective devices for actively shuttered glasses synchronization. In such an implementation, one 3D TV may be selected as a master 3D TV or a master synchronization signal distribution device may be utilized to send the actively shuttered glasses synchronization signaling to each other device within visual range of a viewer of content on the 3D TV to synchronize the display refresh rate of these other display devices. As another alternative, the actively shuttered glasses may act as a repeater and propagate a received synchronization signal for reception by other display devices. However, it is understood that battery life for actively shuttered glasses in such an implementation may be compromised. Accordingly, such an implementation may be well suited for a consumer electronics retail environment where a battery charging cradle for the actively shuttered glasses may be made readily available and consumers may only utilize the actively shuttered glasses for short periods of time, thereby allowing the actively shuttered glasses to remain reasonably charged. Stand-alone actively shuttered glasses synchronization signal repeater devices may also be implemented for home or consumer electronics retail environment use. Many other applications are possible and all are considered within the scope of the present subject matter.

It is further noted that different devices of a given model of device may have negligible differences between internal video processing delays for display refresh rate, while devices of different models or manufacturers may have measureable differences between internal video processing delays for display refresh rate. As such, the present subject matter provides for compensation for differences in internal video processing delays of different devices for synchronization with actively shuttered glasses. For example, where a single device is proximate to a 3D TV, compensation may be less important than in a situation, such as that described above, of a consumer electronics retail environment where multiple display devices are placed in close proximity to a 3D TV or where multiple 3D TVs are placed in close proximity to one another.

In such a situation, a master 3D TV or a master actively shuttered glasses synchronization signal distribution device that regulates and distributes the actively shuttered glasses synchronization signaling may also consider differences in delays associated with different device models between the different devices to which the actively shuttered glasses synchronization signal is to be distributed. Additionally, frame buffering delays or frame delays may be considered. The master 3D TV or the master synchronization signal distribution device may compensate and stagger the signal initiation to each display device to allow for propagation to further display devices and/or to compensate for internal video processing delays of such display devices. Alternatively, the master 3D TV or the master synchronization signal distribution device may distribute a compensation factor in association with the actively shuttered glasses synchronization signal(ing) to allow each device to compensate for the delay. Internal delays within the actively shuttered glasses synchronization signal distribution device may also be compensated. As another alternative, each display device may identify its internal video processing delay characteristics and may be provided with flight delay information associated with the actively shuttered glasses synchronization signal to compensate refresh timing for such delays. Many other delay compensation approaches are possible and all are considered within the scope of the present subject matter.

For purposes of the present subject matter, it is understood that several forms of 3D content are presently available. For example, 3D video content may be encoded for polarized, frame sequential, or 3D-capable display output devices. For polarized encoding, 3D video content may be generated by merging left and right images in either a side-by-side or top-and-bottom format on each frame of video content. At rendering, these images are scaled and formatted with opposite circular polarization onto odd and even lines of each displayed video frame, respectively. Passive polarized 3D glasses are used to present the left and right eye images to the viewer. Alternatively, a frame sequential format operating at twice the frame rate of polarized encoding may be used such that each of the left and right images is sequentially rendered. Actively shuttered glasses are used to synchronize with and select which lens is active for each sequential frame. Resolution of 3D imaging may be compromised using either of the described 3D encoding and rendering options. Alternatively, 3D-capable displays are available that perform the conversion of 3D video content to a 3D rendered output and may have a higher rendering resolution for 3D content than either of the approaches that use passive or active glasses. It should be understood that the present subject matter applies to frame sequential and other active 3D video content encoding and rendering formats. It is also understood that a person of ordinary skill in the art will be able to implement the present subject matter based upon the present description. As such, further details of 3D encoding and rendering will not be described herein.

Figure 1:
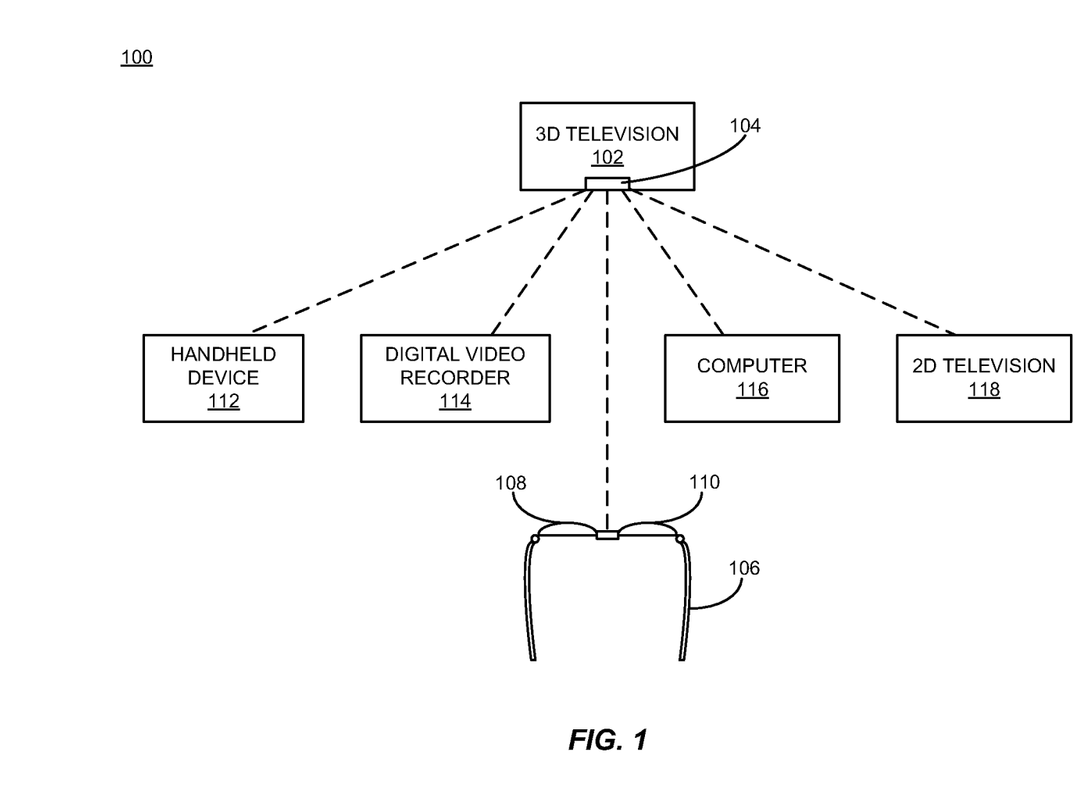
FIG. 1 is a block diagram of an example of an implementation of a system for automated display synchronization with actively shuttered glasses consistent with certain embodiments of the present invention.

Turning now to FIG. 1, FIG. 1 is a block diagram of an example of an implementation of a system 100 for automated display synchronization with actively shuttered glasses. A 3D television 102 emits, via an infrared (IR) blaster 104 (e.g., one or more IR light emitting diodes (LEDs)), actively shuttered glasses synchronization signaling as illustrated via the dashed lines within FIG. 1.

Actively shuttered glasses 106 may receive the actively shuttered glasses synchronization signaling. The actively shuttered glasses synchronization signaling causes the actively shuttered glasses 106 to actively and iteratively rotate polarization ninety degrees (90°) for each of the lens 108 and the lens 110 in an alternating manner to open and close, respectively, each of the lens 108 and the lens 110 for sequential left and right eye frames of 3D video content displayed on the 3D television 102.

As can be seen from FIG. 1, a handheld device 112, a digital video recorder 114, a computer 116, and a two-dimensional (2D) television 118 are also shown in proximity to the 3D television 102 and the actively shuttered glasses 106. The handheld device 112 may include, for example, a cell phone, a personal digital assistant (PDA), a game system, or any other handheld device. The digital video recorder 114 may include, for example, a set-top box (STB) or other device capable of recording digital video. For purposes of the present example, the digital video recorder 114 is assumed to have an LED output display or array as a user interface output device that is actively refreshed. It should be noted that the digital video recorder 114 in the present example is utilized to represent a class of devices that may also include stereo and other home theater equipment. It is further understood that any such device may also include an LED output display or array as a user interface output device that is actively refreshed. Alternatively, a digital video recorder, such as the digital video recorder 114 and other stereo and other home theater equipment, may have a liquid crystal diode (LCD) or other output display that is actively refreshed. Accordingly, the present subject matter applies to any device that includes an actively refreshed output device that may be synchronized with actively shuttered glasses synchronization signaling. The computer 116 may include any stationary or portable computing device with an output display device. It is understood that different refresh timing requirements exist for different types of output display devices and that such differences would be considered in association with any given implementation of the present subject matter. The 2D television 118 may also include such an output device.

As described above, the synchronization signaling represented by the dashed lines within FIG. 1 may be received by each of the handheld device 112, the digital video recorder 114, the computer 116, and the 2D television 118, in addition to being received the actively shuttered glasses 106. Where each of the respective devices includes an IR input device (not shown) that is capable of detecting the actively shuttered glasses synchronization signaling and each such device is located within a field of view of the IR blaster 104, then each device may receive the synchronization signaling via the respective IR input device. Where any such device is not situated within the field of view of the IR blaster 104 of the 3D television 102, or does not have an IR input device, Bluetooth® or other wireless communication protocol may be used to communicate the actively shuttered glasses synchronization signaling from the 3D television 102 to any such device.

Figure 2:
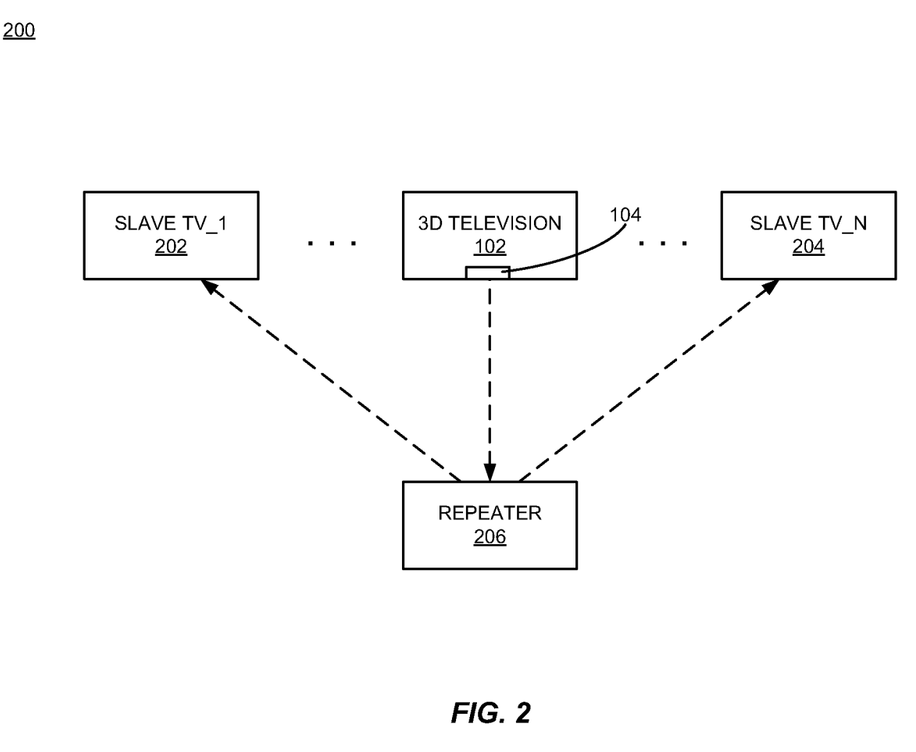
FIG. 2 is a block diagram of an example of an implementation of a system for repeater-based synchronization of multiple display devices with an actively shuttered glasses synchronization signal consistent with certain embodiments of the present invention.

FIG. 2 is a block diagram of an example of an implementation of a system 200 for repeater-based synchronization of multiple display devices with an actively shuttered glasses synchronization signal. The system 200 of FIG. 2 may be utilized, for example, within a consumer electronics retail environment. The 3D television 102 is again illustrated with the IR blaster 104. For purposes of the present example, the 3D television 102 may be considered a master television device where the IR blaster 104 generates an actively shuttered glasses synchronization signal for synchronizing aperture controls for each lens of actively shuttered glasses (not shown for ease of illustration purposes). A repeater 206 may receive the actively shuttered glasses synchronization signaling from the 3D television 102 and may propagate the received synchronization signaling for reception by a slave TV_1 202 through a slave TV_N 204.

It is understood that the slave TV_1 202 through the slave TV_N 204 may be 2D televisions or 3D televisions, or other devices with output displays that are refreshed on a periodic basis, as appropriate for a given implementation. The repeater 206 may be located, for example, within actively shuttered glasses, such as the actively shuttered glasses 106 (not shown), or may be located at a shelf or rack across an aisle from the 3D television 102 and the respective slave TV devices within the consumer electronics retail environment. As described above, when a repeater device, such as the repeater 206, is associated with actively shuttered glasses, battery life may be an issue. Accordingly, a charging cradle (not shown) may be situated within the consumer electronics retail environment or within a home environment and the actively shuttered glasses, including the repeater 206, may be stored and charged via the battery charging cradle. Alternatively, the repeater may be continuously powered by household or commercial line power.

Figure 3:
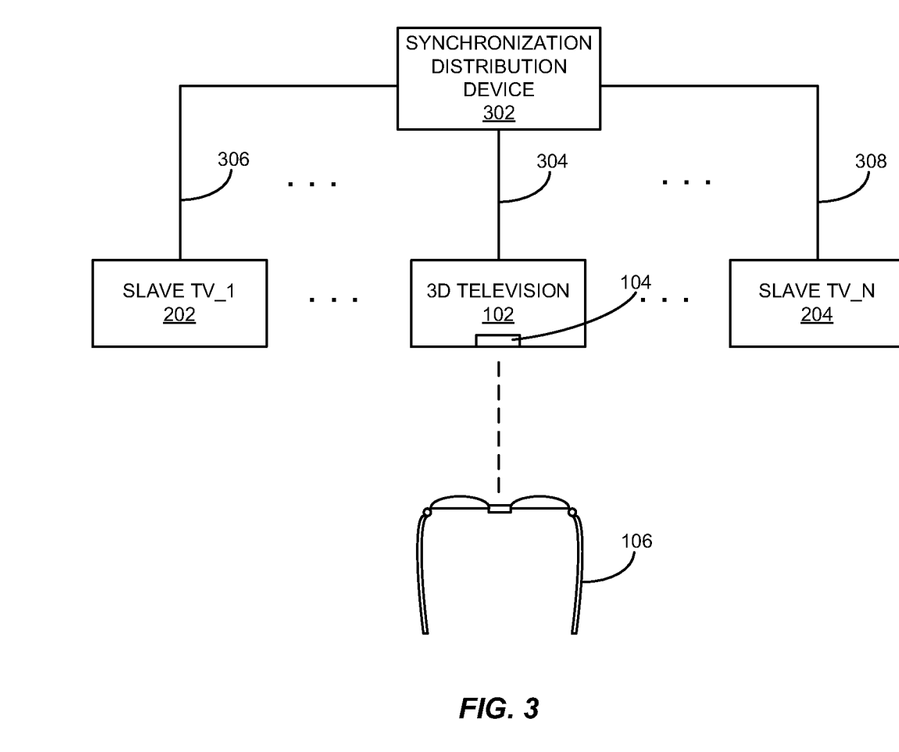
FIG. 3 is a block diagram of an example of an implementation of a system for actively shuttered glasses synchronization signal distribution via an actively shuttered glasses synchronization signaling distribution device consistent with certain embodiments of the present invention.

FIG. 3 is a block diagram of an example of an implementation of a system 300 for actively shuttered glasses synchronization signal distribution via an actively shuttered glasses synchronization signaling distribution device. The 3D television 102 with the IR blaster 104 and the actively shuttered glasses 106 are again illustrated along with the slave TV_1 202 through the slave TV_N 204. As described above, the slave TV_1 202 through the slave TV_N 204 may include one or more 2D televisions or 3D televisions, or other devices with output displays, as appropriate for a given implementation. An actively shuttered glasses synchronization distribution device 302 receives actively shuttered glasses synchronization signaling from the 3D television 102 via an interconnection 304. For purposes of the present example, the interconnection 304 may include an IR input for receiving the actively shuttered glasses synchronization signaling generated by the IR blaster 104, a wireless interconnection, an optical interconnection, or a conductive interconnection as appropriate for a given implementation. As such, placement of the actively shuttered glasses synchronization distribution device 302 at the location illustrated within FIG. 3 is for ease of illustration purposes and the actively shuttered glasses synchronization distribution device 302 may be located as appropriate for any implementation based upon the type of actively shuttered glasses synchronization signaling received from the 3D television 102. Further, for an IR interconnection, the actively shuttered glasses synchronization distribution device 302 may be implemented in association with a repeater device, such as the repeater 206, described above.

For implementations other than direct receipt of the IR actively shuttered glasses synchronization signaling, the synchronization signaling received by the actively shuttered glasses synchronization distribution device 302 from the 3D television 102 may be time synchronized with the IR signaling transmitted from the 3D television 102 via the IR blaster 104 to the actively shuttered glasses 106 as represented by the dashed line within FIG. 3. The actively shuttered glasses synchronization distribution device 302 may distribute synchronization signaling to each of the slave TV_1 202 through the slave TV_N 204 via interconnections shown generally within FIG. 3 as interconnection 306 through interconnection 308.

As described above, the actively shuttered glasses synchronization distribution device 302 may obtain information associated with manufacturers and models of the slave TV_1 202 through the slave TV_N 204. From this information, the actively shuttered glasses synchronization distribution device 302 may compensate for internal actively shuttered glasses video synchronization processing delays associated with the respective slave TVs and may compensate for delays associated with propagation of the actively shuttered glasses synchronization signaling via the interconnections represented by the interconnection 304, and the interconnection 306 through the interconnection 308. Alternatively, the actively shuttered glasses synchronization distribution device 302 may distribute propagation information to the respective slave TVs to allow the slave TVs to perform the actively shuttered glasses synchronization signal compensation. As such, the actively shuttered glasses synchronization distribution device 302 may distribute actively shuttered glasses synchronization signaling to each of the slave TV_1 202 through the slave TV_N 204.

Figure 4:
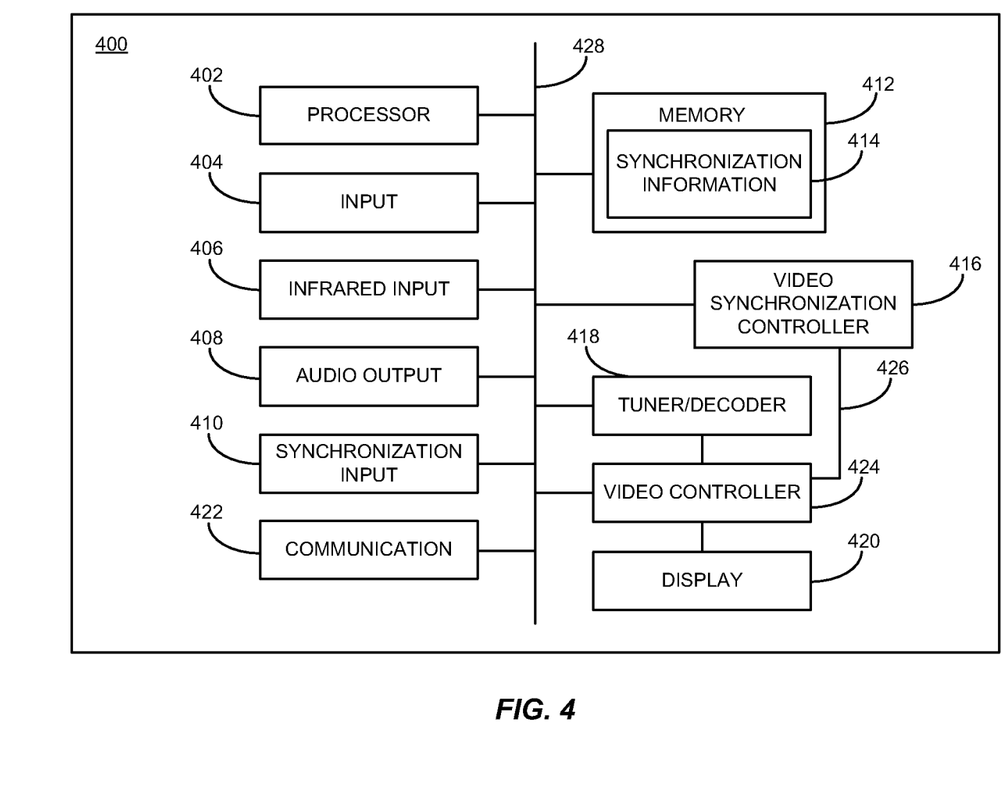
FIG. 4 is a block diagram of a core processing module for automated display synchronization with actively shuttered glasses consistent with certain embodiments of the present invention.

FIG. 4 is a block diagram of a core processing module 400 for automated display synchronization with actively shuttered glasses. The core processing module 400 may form a portion of any of the handheld device 112, the digital video recorder 114, the computer 116, the 2D television 118, or any other device within which the present subject matter is to be implemented to synchronize an output display refresh rate with actively shuttered glasses. It is understood that certain of the components described below may be omitted as appropriate for any given implementation of the core processing module 400.

A processor 402 provides computer instruction execution, computation, and other capabilities within the core processing module 400. An input device 404 provides input capabilities for the user. The input device 404 may include a mouse, pen, trackball, or other input device. One or more input devices, such as the input device 404, may be used. An infrared input device 406 provides input capabilities for receiving actively shuttered glasses synchronization signaling, such as infrared signaling from the IR blaster 104 associated with the 3D television 102 that controls the actively shuttered glasses 106, for automated display synchronization with actively shuttered glasses, as described above and in more detail below. The infrared input device 406 may also receive user inputs associated with an infrared remote control device (not shown) as appropriate for a given implementation.

An audio output device 408 provides audio output capabilities for the core processing module 400. The audio output device 408 may include a speaker, driver circuitry, and interface circuitry as appropriate for a given implementation.

An actively shuttered glasses synchronization input module 410 provides electrical synchronization signaling input capabilities for certain implementations, such as for example, the example of FIG. 3. In such an implementation, the core processing module 400 may receive actively shuttered glasses synchronization signaling from the actively shuttered glasses synchronization distribution device 302 via the actively shuttered glasses synchronization input module 410.

A memory 412 includes a synchronization information storage area 414. The synchronization information storage area 414 may store information, such as received actively shuttered glasses synchronization timing information, actively shuttered glasses synchronization correction and compensation information, and other information associated with automated display synchronization with actively shuttered glasses.

It is understood that the memory 412 may include any combination of volatile and non-volatile memory suitable for the intended purpose, distributed or localized as appropriate, and may include other memory segments not illustrated within the present example for ease of illustration purposes. For example, the memory 412 may include a code storage area, a code execution area, and a data area without departure from the scope of the present subject matter.

A video synchronization controller module 416 is also illustrated. The video synchronization controller module 416 provides synchronization adjustment and control for the core processing module 400, as described above and in more detail below. The video synchronization controller module 416 implements the automated display synchronization with actively shuttered glasses of the core processing module 400.

A tuner/decoder module 418 receives television (e.g., audio/video) content and decodes that content for display via a display 420. The content may include content formatted either via any of the motion picture expert group (MPEG) standards, or content formatted in any other suitable format for reception by the tuner/decoder module 418. It is understood that the tuner/decoder module 418 may include any hardware, programmed processor(s), and memory used to carry out the functions of the tuner/decoder module 418. For example, the tuner/decoder module 418 may include additional controller circuitry in the form of application specific integrated circuits (ASICs), antennas, processors, and/or discrete integrated circuits and components for performing electrical control activities associated with the tuner/decoder module 418 for tuning to and decoding content received either via wireless or wired connections to the core processing module 400. It is further understood that the tuner/decoder module 418 may form a portion of a device, such as the 2D television 118.

A communication module 422 may alternatively provide communication capabilities for interaction with the display 420, such as for retrieval of audio and video content via a satellite, cable, storage media, the Internet, or other content provider, and other activities as appropriate for a given implementation. The communication module 422 may support wired or wireless standards appropriate for a given implementation. Example wired standards include Internet video link (IVL) interconnection within a home network, for example, such as Sony Corporation's Bravia® Internet Video Link (BIVL™). Example wireless standards include cellular wireless communication and Bluetooth® wireless communication standards. Many other wired and wireless communication standards are possible and all are considered within the scope of the present subject matter.

It should be noted that the video synchronization controller module 416, the tuner/decoder module 418, and the communication module 422 are illustrated as a component-level modules for ease of illustration and description purposes. It is also understood that each of these modules may include any hardware, programmed processor(s), and memory used to carry out the functions of the respective module. For example, each of the video synchronization controller module 416, the tuner/decoder module 418, and the communication module 422 may include additional controller circuitry in the form of application specific integrated circuits (ASICs), processors, antenna(s), and/or discrete integrated circuits and components for performing electrical control activities associated with the respective module. Additionally, the video synchronization controller module 416, the tuner/decoder module 418, and the communication module 422 may include interrupt-level, stack-level, and application-level modules as appropriate. Furthermore, the video synchronization controller module 416, the tuner/decoder module 418, and the communication module 422 may include any memory components used for storage, execution, and data processing by these modules for performing processing activities associated with the respective module.

It should also be noted that the video synchronization controller module 416 may form a portion of other circuitry described without departure from the scope of the present subject matter. Further, the video synchronization controller module 416 may alternatively be implemented as an application stored within the memory 412. In such an implementation, the video synchronization controller module 416 may include instructions executed by the processor 402 for performing the functionality described herein. The processor 402 may execute these instructions to provide the processing capabilities described above and in more detail below for the core processing module 400. The video synchronization controller module 416 may form a portion of an interrupt service routine (ISR), a portion of an operating system, a portion of a browser application, or a portion of a separate application without departure from the scope of the present subject matter.

The display device 420 provides visual and/or other information to a user of the core processing module 400. The display device 420 may include any type of display device, such as a cathode ray tube (CRT), liquid crystal display (LCD), light emitting diode (LED), projection or other display element or panel.

A video controller 424 provides video frame and other controls for output of content to the display 420. The video controller 424 is further controlled by the video synchronization controller module 416 in response to received or detected actively shuttered glasses synchronization signaling associated with the actively shuttered glasses 106. As described above, the infrared input device 406 or the actively shuttered glasses synchronization input device 410 may receive infrared or other synchronization signaling, respectively, as appropriate for a given implementation. This signaling may be processed by the video synchronization controller module 416 and an output synchronization signal 426 may be adjusted and input to the video controller 424 to synchronize the display 420 refresh timing with the refresh timing of a 3D television, such as the 3D television 102. This adjustment may be performed, for example, via a phase-locked loop (not shown) or other circuitry as appropriate for a given implementation.

The processor 402, the input device 404, the infrared input device 406, the audio output device 408, the actively shuttered glasses synchronization input device 410, the memory 412, the video synchronization controller module 416, the tuner/decoder module 418, the communication module 422, and the video controller 424 are interconnected via one or more interconnections shown as interconnection 428 for ease of illustration. The interconnection 428 may include a system bus, a network, or any other interconnection capable of providing the respective components with suitable interconnection for the respective purpose.

Figure 5:
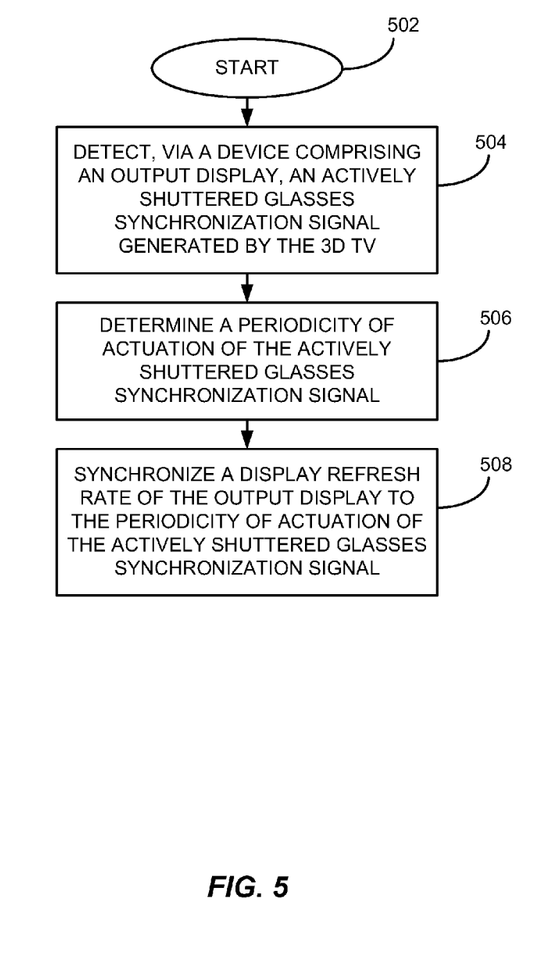
FIG. 5 is a flow chart of an example of an implementation of a process that provides automated display synchronization with actively shuttered glasses consistent with certain embodiments of the present invention.
Figure 6A:
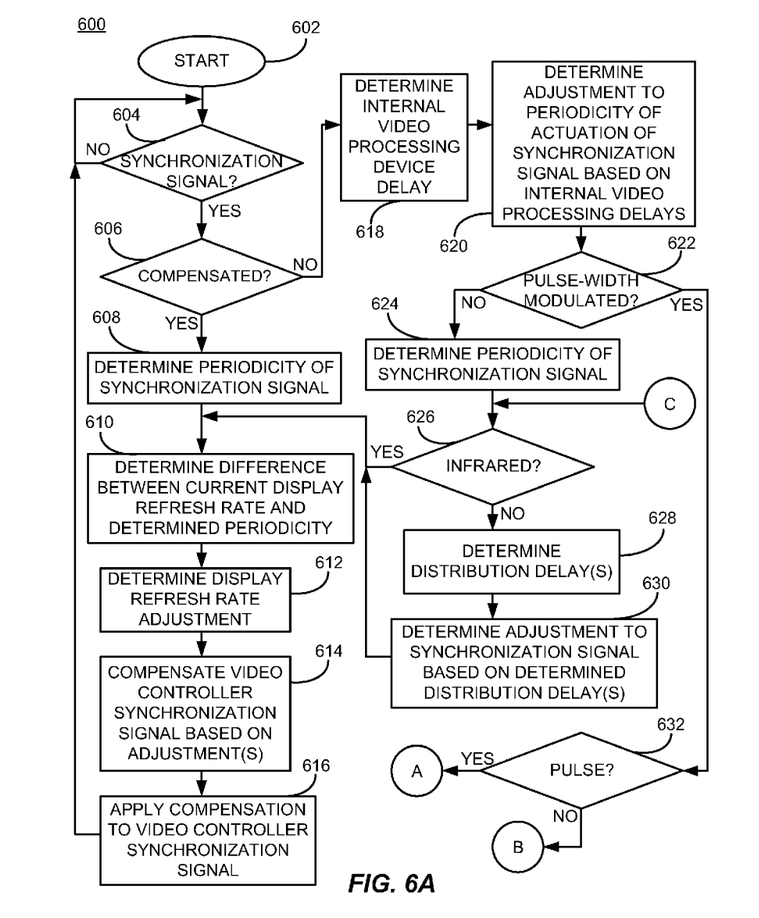
FIG. 6A is a flow chart of an example of an implementation of initial processing of a process that provides automated display synchronization with actively shuttered glasses based upon a type of actively shuttered glasses synchronization signal received consistent with certain embodiments of the present invention.
Figure 6B:
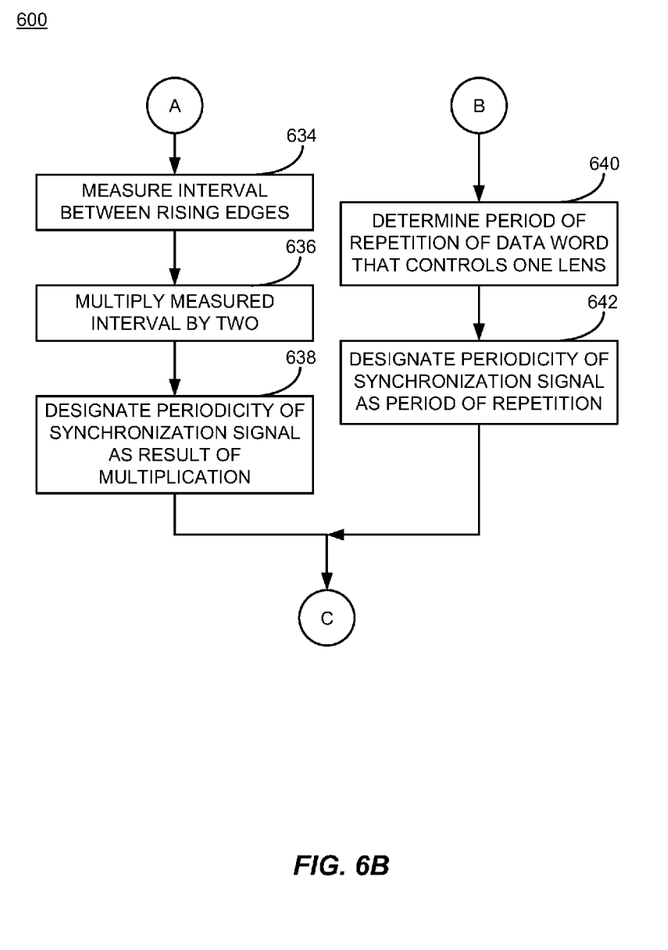
FIG. 6B is a flow chart of an example of an implementation of additional processing of a process that provides automated display synchronization with actively shuttered glasses based upon a type of actively shuttered glasses synchronization signal received consistent with certain embodiments of the present invention.

FIG. 5 through FIG. 6 below describe example processes that may be executed by such devices, such as the core processing module 400, to perform the automated display synchronization with actively shuttered glasses associated with the present subject matter. Many other variations on the example processes are possible and all are considered within the scope of the present subject matter. The example processes may be performed by modules, such as the video synchronization controller module 416 and/or executed by the processor 402, associated with such devices. It should be noted that time out procedures and other error control procedures are not illustrated within the example processes described below for ease of illustration purposes. However, it is understood that all such procedures are considered to be within the scope of the present subject matter.

FIG. 5 is a flow chart of an example of an implementation of a process 500 that provides automated display synchronization with actively shuttered glasses. The process 500 starts at 502. At block 504, the process 500 detects, via a device comprising an output display, an actively shuttered glasses synchronization signal generated by the 3D TV. At block 506, the process 500 determines a periodicity of actuation of the actively shuttered glasses synchronization signal. At block 508, the process 500 synchronizes a display refresh rate of the output display to the periodicity of actuation of the actively shuttered glasses synchronization signal.

FIGS. 6A and 6B illustrate a flow chart of an example of an implementation of a process 600 that provides automated display synchronization with actively shuttered glasses based upon a type of actively shuttered glasses synchronization signal received. FIG. 6A illustrates initial processing within the process 600. The process 600 starts at 602. At decision point 604, the process 600 makes a determination as to whether actively shuttered glasses synchronization signaling has been detected or received. As described above, an actively shuttered glasses synchronization signal may be generated by a 3D TV, such as the 3D television 102, via an IR device, such as the IR blaster 104. The actively shuttered glasses synchronization signal may include an infrared actively shuttered glasses synchronization signal, a wireless actively shuttered glasses synchronization signal, an electrically-propagated actively shuttered glasses synchronization signal, or other actively shuttered glasses synchronization signal as appropriate for a given implementation. The actively shuttered glasses synchronization signal may be received from a 3D television, a repeater device associated with actively shuttered glasses, from an actively shuttered glasses synchronization signal distribution device, or from some other device.

In response to determining that an actively shuttered glasses synchronization signal has been detected or received, the process 600 makes a determination as to whether a compensated actively shuttered glasses synchronization signal (or an actively shuttered glasses synchronization signal with associated compensation information) has been received at decision point 606. As described above, a compensated actively shuttered glasses synchronization signal or compensation information associated with such a signal may be generated either by a 3D television or an actively shuttered glasses synchronization signal distribution device associated with propagation delays based upon a distance of propagation of the compensated actively shuttered glasses synchronization signaling. Alternatively, compensation information may be determined in response to receipt of the synchronization signaling.

In response to determining that a compensated actively shuttered glasses synchronization signal or compensation information associated with such a signal has been received in association with the actively shuttered glasses synchronization signaling at decision point 606, the process 600 determines a periodicity of the actively shuttered glasses synchronization signal at block 608. At block 610, the process 600 determines a difference between a current display refresh rate and the determined periodicity of the detected actively shuttered glasses synchronization signaling. The determined periodicity may include a determined periodicity of actuation of one lens or both lenses of actively shuttered glasses. At block 612, the process 600 determines a display refresh rate adjustment based upon the determined difference between the current display refresh rate and the determined periodicity. At block 614, the process 600 compensates a video controller synchronization signal based upon the determined adjustment(s). In subsequent iterations of the process 600, additional adjustments to the synchronization signaling may be determined, as described in more detail below, and may be performed at block 614.

Though the present example illustrates processing of a compensated actively shuttered glasses synchronization signal or compensation information associated with such a signal that has been received, it is understood that the process 600 may be modified to replace an internal video synchronization signal with a received actively shuttered glasses synchronization signal without additional processing. This processing is not illustrated within FIG. 6 for ease of illustration purposes. However, such reduced processing may be utilized as appropriate for a given implementation without departure from the scope of the present subject matter.

At block 616, the process 600 applies the compensation to the video controller synchronization signal and returns to decision point 604 to determine whether additional actively shuttered glasses synchronization signaling has been received. As such, the process 600 iteratively processes synchronization signaling to synchronize a display refresh rate of an output display to maintain synchronization with an actively shuttered glasses synchronization signal. In the event that a device executing the process 600 is moved from the field of view of an IR blaster, the determined synchronization may be maintained until additional actively shuttered glasses synchronization signaling is detected.

Returning to the description of decision point 606, in response to determining that a compensated actively shuttered glasses synchronization signal has not been received or that no compensation information associated with an actively shuttered glasses synchronization signal has been received with the synchronization signaling, the process 600 determines an internal actively shuttered glasses video processing device delay at block 618. The video processing delay may include, for example, lipsync data obtained from extended display identification data (EDID) stored within a memory, such as the memory 412 describes characteristics of the device. It is understood that the EDID data is often stored in read only memory (ROM) format. At block 620, the process 600 determines an adjustment to periodicity of actuation of the synchronization signaling based upon the internal actively shuttered glasses video device processing delays. At decision point 622, the process 600 makes a determination as to whether the detected actively shuttered glasses synchronization signaling is pulse-width modulated synchronization signaling. In response to determining that the detected synchronization signaling is not pulse-width modulated synchronization signaling, the process 600 determines a periodicity of the actively shuttered glasses synchronization signal at block 624. At decision point 626, the process 600 makes a determination as to whether the detected actively shuttered glasses synchronization signaling is an infrared detected synchronization signal. In response to determining at decision point 626 that the detected actively shuttered glasses synchronization signaling is not infrared signaling, the process 600 determines a distribution delay at block 628. The distribution delay may consider, for example, frame buffering delay and frame delay associated with devices in the distribution chain or other delays as appropriate for a given implementation. At block 630, the process 600 determines an adjustment to the periodicity of the actively shuttered glasses synchronization signal based upon the determined distribution delay(s).

Returning to the description of decision point 626, in response to determining that the received actively shuttered glasses synchronization signaling is infrared synchronization signaling, or upon determining an adjustment to the synchronization signal based upon the determined distribution delay(s) at block 630, the process 600 returns to block 610 and iterates as described above to apply any determined adjustments to the synchronization signaling. As such, for purposes of the present portion of this example, the process 600 omits external processing delay compensation where the detected actively shuttered glasses synchronization signaling is an infrared synchronization signal. However, it is understood that the process 600 may be modified to compensate for infrared processing delays associated with a repeater device, such as the repeater 206, and/or infrared signal propagation delays as appropriate for a given implementation.

Returning to the description of decision point 622, in response to determining that the detected actively shuttered glasses synchronization signaling is pulse-width modulated signaling, the process 600 makes a determination at decision point 632 as to whether the pulse-width modulated (PWM) signaling comprises pulse-width modulated pulse-encoded lens actuation signals for direct actuation of lenses of actively shuttered glasses or data word-based lens actuation signaling. It should be noted that the PWM signal may be pulse encoded with different width pulses for indicating left and right eye controls and may processing may be performed based upon rising and/or falling edges of such pulses. Alternatively, the PWM signal may be encoded with digital data words. These digital data words may include, for example, digital data words for open left shutter, close left shutter, open right shutter, close right shutter, 3D mode "on," 3D mode "off," etc. Many possibilities exist for controls of actively shuttered glasses with digital encoded words and all are considered within the scope of the present subject matter. The process 600 transitions to the processing shown and described below in association with FIG. 6B.

FIG. 6B illustrates additional processing of the process 600 that provides automated display synchronization with actively shuttered glasses based upon a type of actively shuttered glasses synchronization signal received. In response to determining at decision point 632 that the detected synchronization signaling is a pulse-width modulated pulse-encoded lens actuation signal for direct actuation of lenses of actively shuttered glasses, the process 600 measures an interval between rising edges of consecutive pulses of the pulse-width modulated pulse-encoded lens actuation signal at block 634. At block 636, the process 600 multiplies the measured interval by two to account for a full synchronization period for both lenses. At block 638, process 600 designates the periodicity of the synchronization signal as the result of the multiplication and returns to decision point 626 and the processing described within FIG. 6A, and iterates as described above.

In response to determining at decision point 632 that the detected synchronization signaling is a pulse-width modulated data word-based synchronization signal (e.g., not a pulse-encoded lens actuation signal), the process 600 determines a period of repetition of a data word that controls one lens of the actively shuttered glasses at block 640. At block 642, the process 600 designates the periodicity of the synchronization signal as the determined period of repetition of the data word that controls one lens of the actively shuttered glasses. The process 600 again returns to decision point 626 and the processing described within FIG. 6A, and iterates as described above.

As such, the process 600 receives or determines compensation factors for actively shuttered glasses synchronization signaling for actively shuttered glasses. The process 600 determines a difference between a current display refresh rate and a determined periodicity of the actively shuttered glasses synchronization signaling and applies any determined compensation to a video controller synchronization signaling to align the refresh rate of the display with the actively shuttered glasses synchronization signaling that controls the actively shuttered glasses.

Thus, a method of synchronizing displays with actively shuttered glasses associated with a 3D television (TV) involves detecting, via a device including an output display, an actively shuttered glasses synchronization signal generated by the 3D TV; determining a periodicity of actuation of the actively shuttered glasses synchronization signal; and synchronizing a display refresh rate of the output display to the periodicity of actuation of the actively shuttered glasses synchronization signal.

In certain implementations, the method of synchronizing displays with actively shuttered glasses associated with a 3D television (TV) by detecting, via the device including the output display, the actively shuttered glasses synchronization signal generated by the 3D TV involves detecting an infrared actively shuttered glasses synchronization signal generated by the 3D TV. In certain implementations, the method of detecting the infrared actively shuttered glasses synchronization signal generated by the 3D TV involves detecting the infrared actively shuttered glasses synchronization signal generated by the 3D TV via an infrared repeater device. In certain implementations, the infrared repeater device includes an infrared repeater device associated with the actively shuttered glasses. In certain implementations, the method of detecting, via the device including the output display, the actively shuttered glasses synchronization signal generated by the 3D TV involves detecting a wireless actively shuttered glasses synchronization signal generated by the 3D TV. In certain implementations, the method of detecting, via the device including the output display, the actively shuttered glasses synchronization signal generated by the 3D TV involves detecting a compensated actively shuttered glasses synchronization signal generated by an actively shuttered glasses synchronization signal distribution device based upon one of a frame buffering delay and a frame delay. In certain implementations, the method of detecting, via the device including the output display, the actively shuttered glasses synchronization signal generated by the 3D TV involves detecting an electrical actively shuttered glasses synchronization signal via a synchronization distribution circuit coupled to the 3D TV. In certain implementations, the synchronization distribution circuit includes one of a frame buffering delay and a frame delay and is connected to a set of devices including output displays and the method further involves determining an adjustment to the periodicity of actuation of the actively shuttered glasses synchronization signal based upon the one of the frame buffering delay and the frame delay; and the method of determining the periodicity of actuation of the actively shuttered glasses synchronization signal involves adjusting the periodicity based upon the determined adjustment to the periodicity of actuation of the actively shuttered glasses synchronization signal. In certain implementations, the method further involves determining an internal actively shuttered glasses video processing device delay; determining an adjustment to the periodicity of actuation of the actively shuttered glasses synchronization signal based upon the internal actively shuttered glasses video processing device delay; and adjusting the periodicity based upon the determined adjustment to the periodicity of actuation of the actively shuttered glasses synchronization signal. In certain implementations, the method of determining the periodicity of the actuation of the actively shuttered glasses synchronization signal involves determining a periodicity of actuation of at least one lens of the actively shuttered glasses. In certain implementations, the actively shuttered glasses synchronization signal includes a pulse-width modulated actively shuttered glasses synchronization signal and the method of determining the periodicity of the actuation of the actively shuttered glasses synchronization signal involves measuring a time interval between rising edges of a pulse of the pulse-width modulated actively shuttered glasses synchronization signal; multiplying the measured time interval by two; and designating the periodicity of the actuation of the actively shuttered glasses synchronization signal as a result of multiplying the measured time interval by two. In certain implementations, the actively shuttered glasses synchronization signal includes a pulse-width modulated actively shuttered glasses synchronization signal with encoded data words that identify shutter actuation intervals for each lens of the actively shuttered glasses and the method of determining the periodicity of the actuation of the actively shuttered glasses synchronization signal involves determining a period of repetition of an encoded data word that controls opening of one of the lenses of the actively shuttered glasses; and designating the periodicity of the actuation of the actively shuttered glasses synchronization signal as the period of repetition of the encoded data word that controls opening of the one of the lenses of the actively shuttered glasses. In certain implementations, the method of synchronizing the display refresh rate of the output display to the periodicity of actuation of the actively shuttered glasses synchronization signal involves determining a difference between the display refresh rate of the output display and a determined periodicity of actuation of at least one lens of the actively shuttered glasses; and synchronizing the display refresh rate of the output display to the periodicity of actuation of the at least one lens of the actively shuttered glasses, involving determining a display refresh rate adjustment to a video controller circuit associated with the output display based upon the determined difference between the display refresh rate of the output display and the determined periodicity of actuation of the at least one lens of the actively shuttered glasses; and adjusting the video controller circuit based upon the determined display refresh rate adjustment. In certain implementations, the method of synchronizing the display refresh rate of the output display to the periodicity of actuation of the actively shuttered glasses synchronization signal involves iteratively synchronizing the display refresh rate of the output display; and maintaining synchronization with the periodicity of actuation of the actively shuttered glasses synchronization signal. In certain implementations, the device includes a consumer electronics device and the output display includes a front panel display of the consumer electronics device. In certain implementations, the device includes a video playback device and the output display includes a video display.

In another implementation, a computer readable storage medium may store instructions which, when executed on one or more programmed processors, carry out a process of detecting an actively shuttered glasses synchronization signal generated by the 3D TV; determining a periodicity of actuation of the actively shuttered glasses synchronization signal; and synchronizing a display refresh rate of the output display to the periodicity of actuation of the actively shuttered glasses synchronization signal.

In certain implementations, a method of synchronizing displays with actively shuttered glasses associated with a 3D television (TV) involves detecting, via a device including an output display, an infrared actively shuttered glasses synchronization signal generated by the 3D TV; determining a periodicity of actuation of at least one lens of the actively shuttered glasses using the infrared actively shuttered glasses synchronization signal; determining a difference between a display refresh rate of the output display and the determined periodicity of actuation of the at least one lens of the actively shuttered glasses; and synchronizing the display refresh rate of the output display to the periodicity of actuation of the at least one lens of the actively shuttered glasses involving determining a display refresh rate adjustment to a video controller circuit associated with the output display based upon the determined difference between the display refresh rate of the output display and the determined periodicity of actuation of the at least one lens of the actively shuttered glasses; and adjusting the video controller circuit based upon the determined display refresh rate adjustment.

In another implementation, a computer readable storage medium may store instructions which, when executed on one or more programmed processors, carry out a process of detecting, via a device including an output display, an infrared actively shuttered glasses synchronization signal generated by the 3D TV; determining a periodicity of actuation of at least one lens of the actively shuttered glasses using the infrared actively shuttered glasses synchronization signal; determining a difference between a display refresh rate of the output display and the determined periodicity of actuation of the at least one lens of the actively shuttered glasses; and synchronizing the display refresh rate of the output display to the periodicity of actuation of the at least one lens of the actively shuttered glasses involving determining a display refresh rate adjustment to a video controller circuit associated with the output display based upon the determined difference between the display refresh rate of the output display and the determined periodicity of actuation of the at least one lens of the actively shuttered glasses; and adjusting the video controller circuit based upon the determined display refresh rate adjustment.

An apparatus for synchronizing displays with actively shuttered glasses associated with a 3D television (TV), consistent with certain implementations has an output display; and a processor programmed to detect an actively shuttered glasses synchronization signal generated by the 3D TV; determine a periodicity of actuation of the actively shuttered glasses synchronization signal; and synchronize a display refresh rate of the output display to the periodicity of actuation of the actively shuttered glasses synchronization signal.

In certain implementations, the apparatus for synchronizing displays with actively shuttered glasses associated with a 3D television (TV) has a processor that, in being programmed to detect the actively shuttered glasses synchronization signal generated by the 3D TV, is programmed to detect an infrared actively shuttered glasses synchronization signal generated by the 3D TV. In certain implementations, the processor, in being programmed to detect the infrared actively shuttered glasses synchronization signal generated by the 3D TV, is programmed to detect the infrared actively shuttered glasses synchronization signal generated by the 3D TV via an infrared repeater device. In certain implementations, infrared repeater device includes an infrared repeater device associated with the actively shuttered glasses. In certain implementations, the processor, in being programmed to detect the actively shuttered glasses synchronization signal generated by the 3D TV, is programmed to detect a wireless actively shuttered glasses synchronization signal generated by the 3D TV. In certain implementations, the processor, in being programmed to detect the actively shuttered glasses synchronization signal generated by the 3D TV, is programmed to detect a compensated actively shuttered glasses synchronization signal generated by an actively shuttered glasses synchronization signal distribution device based upon one of a frame buffering delay and a frame delay. In certain implementations, the processor, in being programmed to detect the actively shuttered glasses synchronization signal generated by the 3D TV, is programmed to detect an electrical actively shuttered glasses synchronization signal via a synchronization distribution circuit coupled to the 3D TV. In certain implementations, the synchronization distribution circuit includes one of a frame buffering delay and a frame delay and is connected to a set of devices including output displays and the processor is further programmed to determine an adjustment to the periodicity of actuation of the actively shuttered glasses synchronization signal based upon the one of the frame buffering delay and the frame delay; and, in being programmed to determine the periodicity of actuation of the actively shuttered glasses synchronization signal, the processor is programmed to adjust the periodicity based upon the determined adjustment to the periodicity of actuation of the actively shuttered glasses synchronization signal. In certain implementations, the processor is further programmed to determine an internal actively shuttered glasses video processing device delay; determine an adjustment to the periodicity of actuation of the actively shuttered glasses synchronization signal based upon the internal actively shuttered glasses video processing device delay; and adjust the periodicity based upon the determined adjustment to the periodicity of actuation of the actively shuttered glasses synchronization signal. In certain implementations, the processor, in being programmed to determine the periodicity of the actuation of the actively shuttered glasses synchronization signal, is programmed to determine a periodicity of actuation of at least one lens of the actively shuttered glasses. In certain implementations, the actively shuttered glasses synchronization signal includes a pulse-width modulated actively shuttered glasses synchronization signal and, in being programmed to determine the periodicity of the actuation of the actively shuttered glasses synchronization signal, the processor is programmed to measure a time interval between rising edges of a pulse of the pulse-width modulated actively shuttered glasses synchronization signal; multiply the measured time interval by two; and designate the periodicity of the actuation of the actively shuttered glasses synchronization signal as a result of multiplying the measured time interval by two. In certain implementations, the actively shuttered glasses synchronization signal includes a pulse-width modulated actively shuttered glasses synchronization signal with encoded data words that identify shutter actuation intervals for each lens of the actively shuttered glasses and, in being programmed to determine the periodicity of the actuation of the actively shuttered glasses synchronization signal, the processor is programmed to determine a period of repetition of an encoded data word that controls opening of one of the lenses of the actively shuttered glasses; and designate the periodicity of the actuation of the actively shuttered glasses synchronization signal as the period of repetition of the encoded data word that controls opening of the one of the lenses of the actively shuttered glasses. In certain implementations, the processor, in being programmed to synchronize the display refresh rate of the output display to the periodicity of actuation of the actively shuttered glasses synchronization signal, is programmed to determine a difference between the display refresh rate of the output display and a determined periodicity of actuation of at least one lens of the actively shuttered glasses; and synchronize the display refresh rate of the output display to the periodicity of actuation of the at least one lens of the actively shuttered glasses, the processor being programmed to determine a display refresh rate adjustment to a video controller circuit associated with the output display based upon the determined difference between the display refresh rate of the output display and the determined periodicity of actuation of the at least one lens of the actively shuttered glasses; and adjust the video controller circuit based upon the determined display refresh rate adjustment. In certain implementations, the processor, in being programmed to synchronize the display refresh rate of the output display to the periodicity of actuation of the actively shuttered glasses synchronization signal, is programmed to iteratively synchronize the display refresh rate of the output display; and maintain synchronization with the periodicity of actuation of the actively shuttered glasses synchronization signal. In certain implementations, the apparatus includes a consumer electronics device and the output display includes a front panel display of the consumer electronics device. In certain implementations, the apparatus includes a video playback device and the output display includes a video display.

An apparatus for synchronizing displays with actively shuttered glasses associated with a 3D television (TV), consistent with certain implementations has an output display; a video controller circuit that controls a display refresh rate of the output display; and a processor programmed to detect an infrared actively shuttered glasses synchronization signal generated by the 3D TV; determine a periodicity of actuation of at least one lens of the actively shuttered glasses using the infrared actively shuttered glasses synchronization signal; determine a difference between the display refresh rate of the output display and the determined periodicity of actuation of the at least one lens of the actively shuttered glasses; and synchronize the display refresh rate of the output display to the periodicity of actuation of the at least one lens of the actively shuttered glasses, where the processor is further programmed to determine a display refresh rate adjustment to the video controller circuit based upon the determined difference between the display refresh rate of the output display and the determined periodicity of actuation of the at least one lens of the actively shuttered glasses; and adjust the video controller circuit based upon the determined display refresh rate adjustment.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of synchronizing displays with actively shuttered glasses associated with a 3D television (TV), comprising:
   detecting, via a device comprising an output display, an actively shuttered glasses synchronization signal generated by the 3D TV;
   determining a periodicity of actuation of the actively shuttered glasses synchronization signal; and
   synchronizing a display refresh rate of the output display to the periodicity of actuation of the actively shuttered glasses synchronization signal.

2. The method according to claim 1, where detecting, via the device comprising the output display, the actively shuttered glasses synchronization signal generated by the 3D TV comprises detecting an infrared actively shuttered glasses synchronization signal generated by the 3D TV.

3. The method according to claim 2, where detecting the infrared actively shuttered glasses synchronization signal generated by the 3D TV comprises detecting the infrared actively shuttered glasses synchronization signal generated by the 3D TV via an infrared repeater device.

4. The method according to claim 3, where the infrared repeater device comprises an infrared repeater device associated with the actively shuttered glasses.

5. The method according to claim 1, where detecting, via the device comprising the output display, the actively shuttered glasses synchronization signal generated by the 3D TV comprises detecting a wireless actively shuttered glasses synchronization signal generated by the 3D TV.

6. The method according to claim 1, where detecting, via the device comprising the output display, the actively shuttered glasses synchronization signal generated by the 3D TV comprises detecting a compensated actively shuttered glasses synchronization signal generated by an actively shuttered glasses synchronization signal distribution device based upon one of a frame buffering delay and a frame delay.

7. The method according to claim 1, where detecting, via the device comprising the output display, the actively shuttered glasses synchronization signal generated by the 3D TV comprises detecting an electrical actively shuttered glasses synchronization signal via a synchronization distribution circuit coupled to the 3D TV.

8. The method according to claim 7, where the synchronization distribution circuit comprises one of a frame buffering delay and a frame delay and is connected to a plurality of devices comprising output displays and further comprising:
   determining an adjustment to the periodicity of actuation of the actively shuttered glasses synchronization signal based upon the one of the frame buffering delay and the frame delay; and
   where determining the periodicity of actuation of the actively shuttered glasses synchronization signal comprises:
      adjusting the periodicity based upon the determined adjustment to the periodicity of actuation of the actively shuttered glasses synchronization signal.

9. The method according to claim 1, further comprising:
   determining an internal actively shuttered glasses video processing device delay;
   determining an adjustment to the periodicity of actuation of the actively shuttered glasses synchronization signal based upon the internal actively shuttered glasses video processing device delay; and
   adjusting the periodicity based upon the determined adjustment to the periodicity of actuation of the actively shuttered glasses synchronization signal.

10. The method according to claim 1, where determining the periodicity of the actuation of the actively shuttered glasses synchronization signal comprises:
   determining a periodicity of actuation of at least one lens of the actively shuttered glasses.

11. The method according to claim 1, where the actively shuttered glasses synchronization signal comprises a pulse-width modulated actively shuttered glasses synchronization signal and determining the periodicity of the actuation of the actively shuttered glasses synchronization signal comprises:
   measuring a time interval between rising edges of a pulse of the pulse-width modulated actively shuttered glasses synchronization signal;
   multiplying the measured time interval by two; and
   designating the periodicity of the actuation of the actively shuttered glasses synchronization signal as a result of multiplying the measured time interval by two.

12. The method according to claim 1, where the actively shuttered glasses synchronization signal comprises a pulse-width modulated actively shuttered glasses synchronization signal with encoded data words that identify shutter actuation intervals for each lens of the actively shuttered glasses and determining the periodicity of the actuation of the actively shuttered glasses synchronization signal comprises:
   determining a period of repetition of an encoded data word that controls opening of one of the lenses of the actively shuttered glasses; and
   designating the periodicity of the actuation of the actively shuttered glasses synchronization signal as the period of repetition of the encoded data word that controls opening of the one of the lenses of the actively shuttered glasses.

13. The method according to claim 1, where synchronizing the display refresh rate of the output display to the periodicity of actuation of the actively shuttered glasses synchronization signal comprises:
   determining a difference between the display refresh rate of the output display and a determined periodicity of actuation of at least one lens of the actively shuttered glasses; and
   synchronizing the display refresh rate of the output display to the periodicity of actuation of the at least one lens of the actively shuttered glasses comprising:
      determining a display refresh rate adjustment to a video controller circuit associated with the output display based upon the determined difference between the display refresh rate of the output display and the determined periodicity of actuation of the at least one lens of the actively shuttered glasses; and
      adjusting the video controller circuit based upon the determined display refresh rate adjustment.

14. The method according to claim 1, where synchronizing the display refresh rate of the output display to the periodicity of actuation of the actively shuttered glasses synchronization signal comprises:
   iteratively synchronizing the display refresh rate of the output display; and
   maintaining synchronization with the periodicity of actuation of the actively shuttered glasses synchronization signal.

15. The method according to claim 1, where the device comprises a consumer electronics device and the output display comprises a front panel display of the consumer electronics device.

16. The method according to claim 1, where the device comprises a video playback device and the output display comprises a video display.

17. A non-transitory computer readable storage medium storing instructions which, when executed on one or more programmed processors, carry out a method according to claim 1.

18. A method of synchronizing displays with actively shuttered glasses associated with a 3D television (TV), comprising:
   detecting, via a device comprising an output display, an infrared actively shuttered glasses synchronization signal generated by the 3D TV;
   determining a periodicity of actuation of at least one lens of the actively shuttered glasses using the infrared actively shuttered glasses synchronization signal;
   determining a difference between a display refresh rate of the output display and the determined periodicity of actuation of the at least one lens of the actively shuttered glasses; and
   synchronizing the display refresh rate of the output display to the periodicity of actuation of the at least one lens of the actively shuttered glasses comprising:
      determining a display refresh rate adjustment to a video controller circuit associated with the output display based upon the determined difference between the display refresh rate of the output display and the determined periodicity of actuation of the at least one lens of the actively shuttered glasses; and
      adjusting the video controller circuit based upon the determined display refresh rate adjustment.

19. A non-transitory computer readable storage medium storing instructions which, when executed on one or more programmed processors, carry out a method according to claim 18.

20. An apparatus for synchronizing displays with actively shuttered glasses associated with a 3D television (TV), comprising:
   an output display; and
   a processor programmed to:
      detect an actively shuttered glasses synchronization signal generated by the 3D TV;
      determine a periodicity of actuation of the actively shuttered glasses synchronization signal; and
      synchronize a display refresh rate of the output display to the periodicity of actuation of the actively shuttered glasses synchronization signal.

21. The apparatus according to claim 20, where, in being programmed to detect the actively shuttered glasses synchronization signal generated by the 3D TV, the processor is programmed to detect an infrared actively shuttered glasses synchronization signal generated by the 3D TV.

22. The apparatus according to claim 21, where, in being programmed to detect the infrared actively shuttered glasses synchronization signal generated by the 3D TV, the processor is programmed to detect the infrared actively shuttered glasses synchronization signal generated by the 3D TV via an infrared repeater device.

23. The apparatus according to claim 22, where the infrared repeater device comprises an infrared repeater device associated with the actively shuttered glasses.

24. The apparatus according to claim 20, where, in being programmed to detect the actively shuttered glasses synchronization signal generated by the 3D TV, the processor is programmed to detect a wireless actively shuttered glasses synchronization signal generated by the 3D TV.

25. The apparatus according to claim 20, where, in being programmed to detect the actively shuttered glasses synchronization signal generated by the 3D TV, the processor is programmed to detect a compensated actively shuttered glasses synchronization signal generated by an actively shuttered glasses synchronization signal distribution device based upon one of a frame buffering delay and a frame delay.

26. The apparatus according to claim 20, where, in being programmed to detect the actively shuttered glasses synchronization signal generated by the 3D TV, the processor is programmed to detect an electrical actively shuttered glasses synchronization signal via a synchronization distribution circuit coupled to the 3D TV.

27. The apparatus according to claim 26, where the synchronization distribution circuit comprises one of a frame buffering delay and a frame delay and is connected to a plurality of devices comprising output displays and the processor is further programmed to:
   determine an adjustment to the periodicity of actuation of the actively shuttered glasses synchronization signal based upon the one of the frame buffering delay and the frame delay; and
   where, in being programmed to determine the periodicity of actuation of the actively shuttered glasses synchronization signal, the processor is programmed to:
      adjust the periodicity based upon the determined adjustment to the periodicity of actuation of the actively shuttered glasses synchronization signal.

28. The apparatus according to claim 20, where the processor is further programmed to:
   determine an internal actively shuttered glasses video processing device delay;
   determine an adjustment to the periodicity of actuation of the actively shuttered glasses synchronization signal based upon the internal actively shuttered glasses video processing device delay; and
   adjust the periodicity based upon the determined adjustment to the periodicity of actuation of the actively shuttered glasses synchronization signal.

29. The apparatus according to claim 20, where, in being programmed to determine the periodicity of the actuation of the actively shuttered glasses synchronization signal, the processor is programmed to:
   determine a periodicity of actuation of at least one lens of the actively shuttered glasses.

30. The apparatus according to claim 20, where the actively shuttered glasses synchronization signal comprises a pulse-width modulated actively shuttered glasses synchronization signal and, in being programmed to determine the periodicity of the actuation of the actively shuttered glasses synchronization signal, the processor is programmed to:
   measure a time interval between rising edges of a pulse of the pulse-width modulated actively shuttered glasses synchronization signal;
   multiply the measured time interval by two; and
   designate the periodicity of the actuation of the actively shuttered glasses synchronization signal as a result of multiplying the measured time interval by two.

31. The apparatus according to claim 20, where the actively shuttered glasses synchronization signal comprises a pulse-width modulated actively shuttered glasses synchronization signal with encoded data words that identify shutter actuation intervals for each lens of the actively shuttered glasses and, in being programmed to determine the periodicity of the actuation of the actively shuttered glasses synchronization signal, the processor is programmed to:

determine a period of repetition of an encoded data word that controls opening of one of the lenses of the actively shuttered glasses; and designate the periodicity of the actuation of the actively shuttered glasses synchronization signal as the period of repetition of the encoded data word that controls opening of the one of the lenses of the actively shuttered glasses.

32. The apparatus according to claim 20, where, in being programmed to synchronize the display refresh rate of the output display to the periodicity of actuation of the actively shuttered glasses synchronization signal, the processor is programmed to:

determine a difference between the display refresh rate of the output display and a determined periodicity of actuation of at least one lens of the actively shuttered glasses; and synchronize the display refresh rate of the output display to the periodicity of actuation of the at least one lens of the actively shuttered glasses, the processor being programmed to:

determine a display refresh rate adjustment to a video controller circuit associated with the output display based upon the determined difference between the display refresh rate of the output display and the determined periodicity of actuation of the at least one lens of the actively shuttered glasses; and adjust the video controller circuit based upon the determined display refresh rate adjustment.

33. The apparatus according to claim 20, where, in being programmed to synchronize the display refresh rate of the output display to the periodicity of actuation of the actively shuttered glasses synchronization signal, the processor is programmed to:

iteratively synchronize the display refresh rate of the output display; and maintain synchronization with the periodicity of actuation of the actively shuttered glasses synchronization signal.

34. The apparatus according to claim 20, where the apparatus comprises a consumer electronics device and the output display comprises a front panel display of the consumer electronics device.

35. The apparatus according to claim 20, where the apparatus comprises a video playback device and the output display comprises a video display.

36. A apparatus for synchronizing displays with actively shuttered glasses associated with a 3D television (TV), comprising:

an output display;

a video controller circuit that controls a display refresh rate of the output display; and a processor programmed to:

detect an infrared actively shuttered glasses synchronization signal generated by the 3D TV;

determine a periodicity of actuation of at least one lens of the actively shuttered glasses using the infrared actively shuttered glasses synchronization signal;

determine a difference between the display refresh rate of the output display and the determined periodicity of actuation of the at least one lens of the actively shuttered glasses; and synchronize the display refresh rate of the output display to the periodicity of actuation of the at least one lens of the actively shuttered glasses, where the processor is further programmed to:

determine a display refresh rate adjustment to the video controller circuit based upon the determined difference between the display refresh rate of the output display and the determined periodicity of actuation of the at least one lens of the actively shuttered glasses; and adjust the video controller circuit based upon the determined display refresh rate adjustment.

* * * * *